(12) United States Patent
Woodruff et al.

(10) Patent No.: US 10,242,377 B2
(45) Date of Patent: Mar. 26, 2019

(54) SYSTEMS AND METHODS FOR ANALYZING BUSINESSES BASED ON GRATUITIES

(71) Applicant: MasterCard International Incorporated, Purchase, NY (US)

(72) Inventors: Todd Woodruff, St. Charles, MO (US); David J. Senci, Troy, IL (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 361 days.

(21) Appl. No.: 15/059,016

(22) Filed: Mar. 2, 2016

(65) Prior Publication Data
US 2017/0255956 A1 Sep. 7, 2017

(51) Int. Cl.
*G06Q 30/02* (2012.01)
*G06Q 20/40* (2012.01)
*G06Q 10/06* (2012.01)
*G06Q 20/32* (2012.01)
*G06Q 50/00* (2012.01)
(Continued)

(52) U.S. Cl.
CPC ......... *G06Q 30/0214* (2013.01); *G06Q 10/06* (2013.01); *G06Q 10/0639* (2013.01); *G06Q 10/06398* (2013.01); *G06Q 10/10* (2013.01); *G06Q 20/3224* (2013.01); *G06Q 20/401* (2013.01); *G06Q 30/0633* (2013.01); *G06Q 30/0635* (2013.01); *G06Q 30/0641* (2013.01); *G06Q 50/01* (2013.01); *G06Q 50/12* (2013.01)

(58) Field of Classification Search
CPC .. G06Q 50/12; G06Q 20/3224; G06Q 20/401; G06Q 30/024; G06Q 30/0633; G06Q 30/0635; G06Q 30/0641

USPC .......................................................... 705/15
See application file for complete search history.

(56) References Cited

U.S. PATENT DOCUMENTS 7,231,353 B1 6/2007 Goyal
9,183,579 B2 11/2015 Bookstaff
(Continued)

OTHER PUBLICATIONS

Canhoto, Ana Isabel. Profiling behaviour: The social construction of categories in the detection of financial crime. London School of Economics and Political Science (United Kingdom), ProQuest Dissertations Publishing, 2007.*

*Primary Examiner* — Florian M Zeender
*Assistant Examiner* — Fawaad Haider
(74) *Attorney, Agent, or Firm* — Armstrong Teasdale LLP

(57) ABSTRACT

A gratuity analyzing computing device and method are provided. The computing device may include a receiver to receive transaction data of a plurality of merchants, wherein the transaction data includes authorization transactions and clearing transactions, a calculator to match a plurality of authorization transactions with a plurality of clearing transactions, respectively, and calculate gratuity amounts for the plurality of matched transactions, an analyzer to select at least two merchants, generate tip data for each selected merchant, the tip data for a respective merchant being generated based on gratuity amounts of matched transactions that correspond to the respective merchant, and rank the at least two merchants based on a comparison of the generated tip data of the at least two merchants with respect to each other, and a transmitter configured to output the rank and the tip data of the at least two merchants to a user.

11 Claims, 4 Drawing Sheets

(51) Int. Cl.
  *G06Q 50/12* (2012.01)
  *G06Q 30/06* (2012.01)
  *G06Q 10/10* (2012.01)

(56) References Cited

U.S. PATENT DOCUMENTS

| | | |
|---|---|---|
| 2014/0052613 A1 | 2/2014 | Tavakoli et al. |
| 2014/0164151 A1* | 6/2014 | Hockley ................ G06Q 50/12 705/15 |
| 2014/0310117 A1 | 10/2014 | Moshal |
| 2016/0042339 A1 | 2/2016 | Nichols |
| 2016/0078389 A1* | 3/2016 | Kim ................ G06Q 10/06398 705/7.42 |
| 2016/0350769 A1 | 12/2016 | Venkatesh et al. |

* cited by examiner

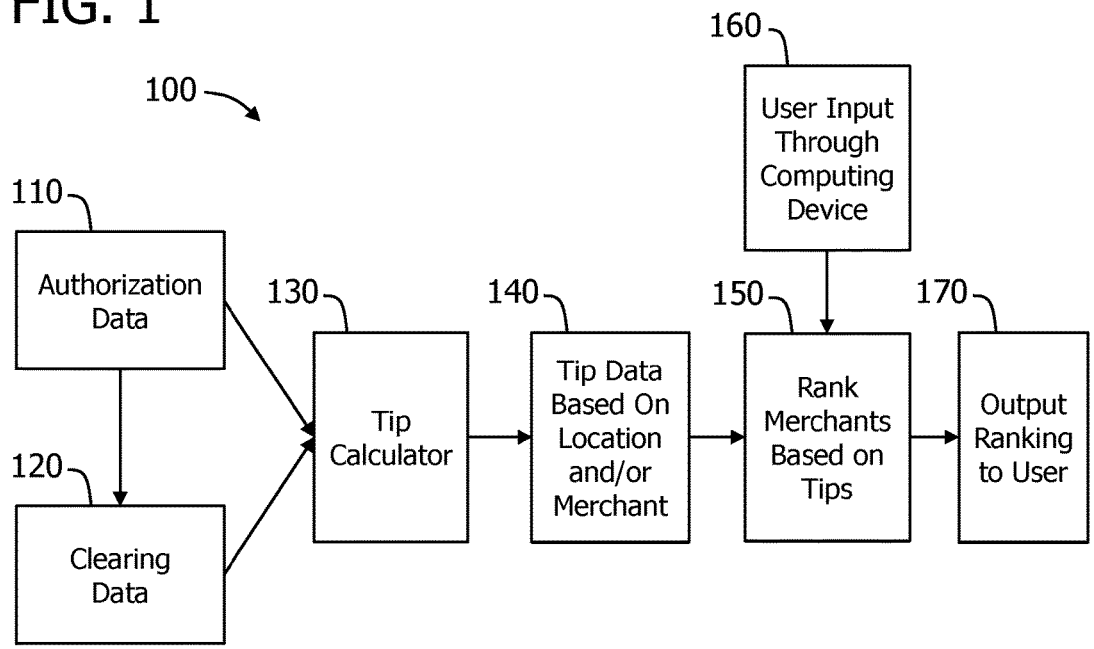
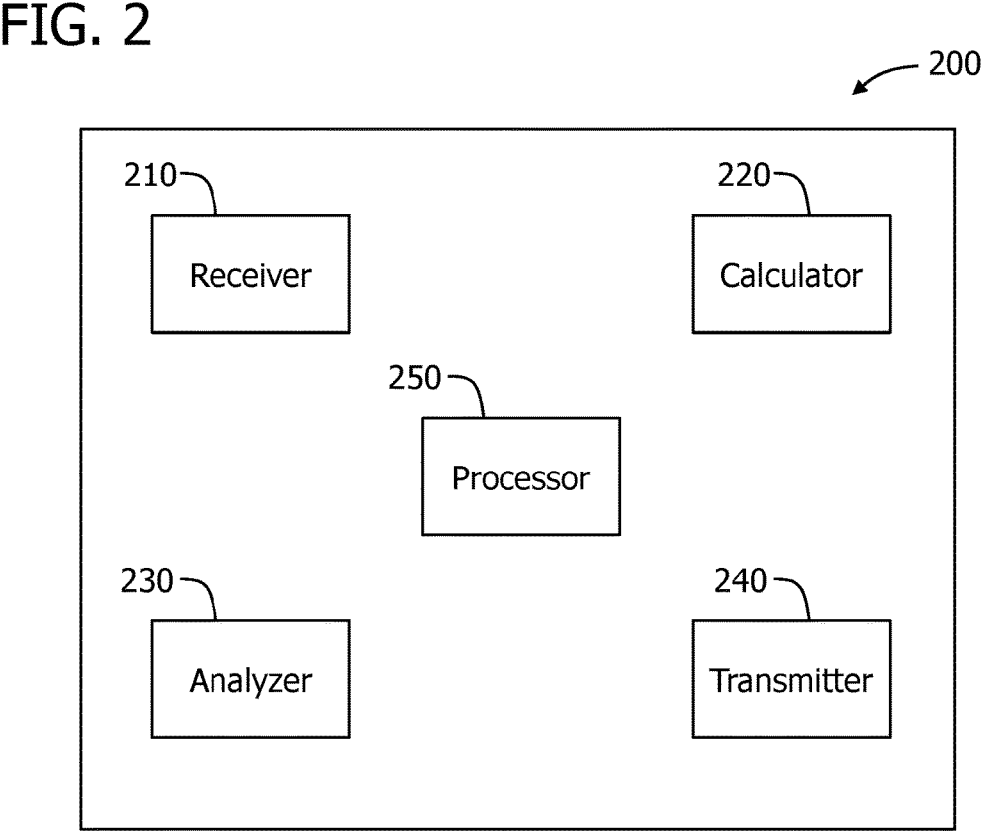

FIG. 4

Insert Location : 62294 (Troy, IL)

| Business: | Tip % | Tip $ | Trend |
|---|---|---|---|
| Troy Restaurant | 20% | $4.33 | ↑ |
| China Garden | 22% | $3.18 | ↓ |
| Dave's Barber | 12% | $1.80 | ↓ |
| Troy Shoe Shine | 10% | $1.01 | ↑ |

FIG. 5

Insert Location : 62294 (Troy, IL)

| Business: | Tip % | Tip $ | Trend |
|---|---|---|---|
| Mexican Restaurants | 20% | $4.33 | ↑ |
| Bars | 22% | $3.18 | ↓ |
| Barber Shops | 12% | $1.80 | ↓ |
| Cleaning Services | 10% | $1.01 | ↑ |

FIG. 6

Insert Locations: 63368 (O'Fallon MO), 63301 (St. Charles MO), 62294 (Troy, IL)

| Business: | Tip % | Tip $ | Trend | Location |
|---|---|---|---|---|
| Barber Shops | 15% | $1.48 | ↑ | Troy, IL |
| Barber Shops | 11% | $1.26 | ↓ | St. Charles, MO |
| Barber Shops | 6% | $1.01 | ↓ | O'Fallon MO |

SYSTEMS AND METHODS FOR ANALYZING BUSINESSES BASED ON GRATUITIES

BACKGROUND

The present application relates generally to a technology that may be used to assist in predicting merchant volatility, and more particularly, to network-based systems and methods for analyzing and comparing businesses based on gratuity information acquired from those businesses.

A gratuity, also referred to as a tip, is an amount of money tendered by a customer to a person associated with a merchant (e.g., an employee) as a way of thanking the person for a service performed. The tip is an amount of money in addition to the base price of the service or the goods purchased by the customer. Tipping is a widely practiced social custom in the United States and is usually voluntary.

For example, tips may be generally given for services performed by employees at restaurants, golf courses, hotels, spas and salons, casinos, barber shops, as well as to taxi drivers, movers, and the like. Higher tips may be given for excellent service while smaller tips or no tip at all may be given for poor service. In the United States, certain types of employees, such as waiters and waitresses in a restaurant, may rely mostly on tips for income because their employers are allowed to pay them less than minimum wage with the expectation that the employee's income will be supplemented by tips.

Tipping is also able to provide insight into a financial outlook for an area, for example, an indication as to whether a community is flourishing or dwindling financially. For example, if an average tipping amount in a particular area is trending upward it may be reasonable to assume that the community in that area is likewise trending upward financially.

Furthermore, for an entity (i.e. a person or company) interested in opening or purchasing a business, it might be beneficial for that entity to know the financial outlook in an area where they desire to open or purchase a business. Accordingly, tipping data may be one source of information used by an entrepreneur to determine the financial outlook of the area in which they desire to open or purchase a business.

Potential employees and business owners/purchasers can benefit greatly from financial information about future employment or business acquisitions. Accordingly, new financial information gathering technology and new financial information about merchants and groups of merchants which are located in a particular geographic area is desirable.

BRIEF DESCRIPTION OF THE DISCLOSURE

In one aspect, a gratuity analyzing computing device is provided. The gratuity analyzing computing device including a receiver configured to receive transaction data of a plurality of merchants, the transaction data comprising authorization transactions and clearing transactions. The gratuity analyzing computing device further including a calculator configured to match a plurality of authorization transactions with a plurality of clearing transactions, respectively, and calculate gratuity amounts for the plurality of matched transactions, an analyzer configured to select at least two merchants from among the plurality of merchants, generate tip data for each merchant of the at least two merchants, the tip data for a respective merchant being generated based on gratuity amounts of matched transactions that correspond to the respective merchant, and rank the at least two merchants based on a comparison of the generated tip data of the at least two merchants with respect to each other, and a transmitter configured to output the rank and the tip data of the at least two merchants to a user.

In another aspect, a method for analyzing gratuity data of merchants and ranking merchants based on the analyzed gratuity data is provided. The method includes receiving transaction data of a plurality of merchants, where the transaction data includes authorization transactions and clearing transactions. The method further including matching a plurality of authorization transactions with a plurality of clearing transactions, respectively, and calculating gratuity amounts for the plurality of matched transactions, selecting at least two merchants from among the plurality of merchants, generating tip data for each merchant of the at least two merchants, the tip data for a respective merchant being generated based on gratuity amounts of matched transactions that correspond to the respective merchant, and ranking the at least two merchants based on a comparison of the generated tip data of the at least two merchants with respect to each other, and outputting the rank and the tip data of the at least two merchants to a user In another aspect, one or more computer-readable storage media having computer-executable instructions embodied thereon for analyzing gratuity data of merchants and ranking merchants based on the analyzed gratuity data are provided. The computer-executable instructions may cause the processor to receive transaction data of a plurality of merchants, where the transaction data includes authorization transactions and clearing transactions, match a plurality of authorization transactions with a plurality of clearing transactions, respectively, and calculate gratuity amounts for the plurality of matched transactions, select at least two merchants from among the plurality of merchants, generate tip data for each merchant of the at least two merchants, the tip data for a respective merchant being generated based on gratuity amounts of matched transactions that correspond to the respective merchant, and rank the at least two merchants based on a comparison of the generated tip data of the at least two merchants with respect to each other, and output the rank and the tip data of the at least two merchants to a user.

BRIEF DESCRIPTION OF THE DRAWINGS

FIG. 1 is a data flow block diagram illustrating an example of a process of calculating and analyzing gratuity data in accordance with an example embodiment of the present disclosure.

FIG. 2 is a diagram illustrating an example of a gratuity analyzing computing device in accordance with an example embodiment of the present disclosure.

FIG. 4 is a diagram illustrating an example of a ranking of tip data of different businesses in the same location being compared with each other, in accordance with an example embodiment of the present disclosure.

FIG. 5 is a diagram illustrating an example of a ranking of tip data of different groups of businesses in the same location being compared with each other, in accordance with an example embodiment of the present disclosure.

FIG. 6 is a diagram illustrating an example of a ranking of tip data of groups of merchants of a same type of business, in different locations, being compared with each other, in accordance with an example embodiment of the present disclosure.

DETAILED DESCRIPTION OF THE DISCLOSURE

Figure 3:
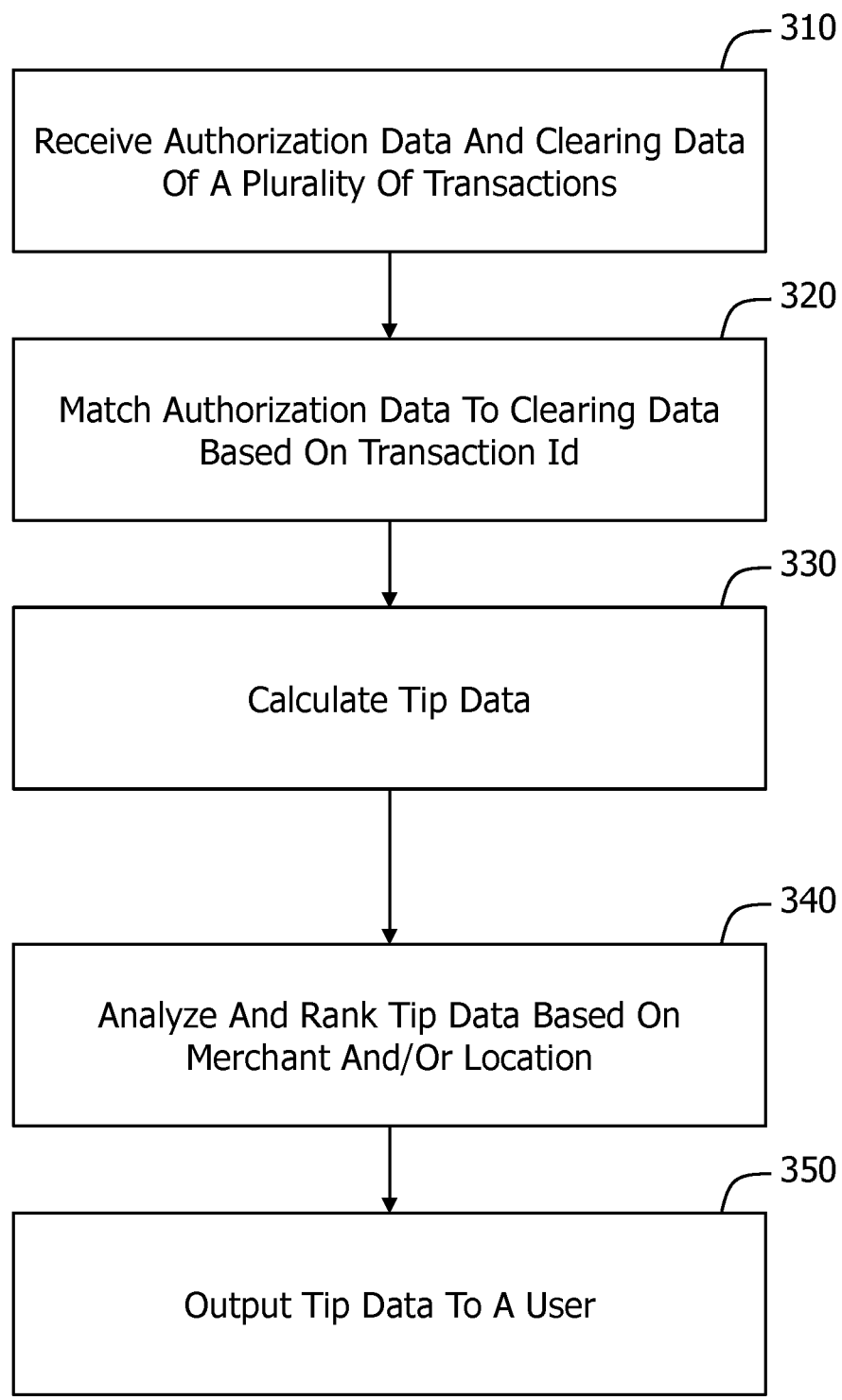
FIG. 3 is a diagram illustrating an example of a gratuity analyzing method in accordance with an example embodiment of the present disclosure.

A cardholder may leave a gratuity for employees of many different types of merchants. The gratuity may be in response to a service provided by the employee, a good or product purchased by the cardholder, or a combination thereof (sometimes referred to as an "item" which could be a good or service). For example, when a customer is finished with a service, such as a meal at a restaurant, an employee typically brings a bill, for example, in paper form, in digital form such as on a tablet or other mobile device, and the like. In the example of the restaurant, the bill typically includes a base price for the food and/or the drinks that were ordered and served to the customer.

In order to pay for the bill, the customer may provide their account information, for example, a payment card account associated with a payment card such as a credit card or a debit card. The employee, in this example, the waiter or waitress, may input the customer's account information by swiping (or otherwise communicating) a payment card through a point-of-sale (POS) device. The input account information may be transmitted to, for example, a payment processor, an issuing bank, and the like, to authorize payment of the bill for the meal. This initial input includes authorization data of the purchase of the meal, and typically includes the base price of the meal. Upon successful authorization of the base price by the issuing bank, a receipt may be printed out or some other form of confirmation may be generated. In this example, the customer may add a gratuity to the base price by inserting the gratuity into the receipt or confirmation. That is, after the initial authorization for the base price of the meal, the customer has the opportunity to add a gratuity.

In another example, a customer may purchase food from a merchant online, such as ordering a pizza, take-out food, groceries, and the like. In this case, the base price authorization could be made online based on account information of a customer that is input through a web browser of the merchant. Again, the customer would have a subsequent opportunity to add gratuity either online or at a time when the food is delivered to a destination of the customer.

When the customer adds a gratuity and adds their signature to or otherwise authorizes the final bill, the employee will typically enter the total payment amount or the total amount may be automatically entered. Here, the total amount includes the tip plus the base price. In this example, the total amount may also be sent to the payment processor as a final amount. For example, a clearing message or clearing data including the final total may be transmitted to the payment processor.

The payment processor may determine that the authorization data for the base price of the meal and the clearing data for the total amount of the meal (i.e., base price plus tip) correspond to the same transaction. For example, the payment processor may perform a clearing/authorization matching process that attempts to link together authorizations with respective clearings based on one or more transaction identifiers included in the authorizations and the clearings. Accordingly, the payment processor may determine that authorization data matches or corresponds to clearing data, and further compare an authorization transaction amount included in the authorization data with a clearing transaction amount included in the clearing data to determine a tip amount.

Example of Determining Tip Amount from Transaction Data and Clearing Data

Gratuities are left for employees of many different kinds of merchants. Examples include servers in a restaurant, caddies at a golf course, stylists in a hair salon, therapists in a massage parlor, movers working for a moving company, and the like. However, such information is not made publically available, nor is it humanly possible to gather such information manually even with the help of a group of others because such information typically encompasses a great deal of transactions at a variety of merchants spread out over a number of geographic locations and time. Therefore, presently there is no such database available to a person that provides them with gratuity information about merchants and/or geographic locations.

A payment processor or other financial entity is in a unique position because they are capable of detecting payment information from purchases made using a payment card or account number of an issuing bank corresponding to the payment processor. The exemplary embodiments described herein, use the payment information to determine gratuity information from transactions that occur at one or more merchants.

For example, based on data from a transaction lifecycle of a purchase (i.e., authorization, clearing, and settlement) a payment processor may determine a gratuity left by a user at a merchant. Accordingly, using this data, a payment processor may calculate and compare tip data of merchants. Furthermore, transaction data may include a geographic location at which the merchant is located. Accordingly, gratuity information about merchants may be compared with other merchants included in a similar geographic location, or at different geographic locations.

According to various examples, transaction data of an authorized transaction may include one or more transaction identifiers. Likewise, clearing data of a cleared transaction may also include one or more transaction identifiers. The authorization data and the clearing data may be included in an authorization message and a clearing message, respectively. The authorization message and the clearing message may be received by a payment processor, for example, MASTERCARD®, VISA®, AMERICAN EXPRESS®, DINERS CLUB®, and the like. The transaction identifiers may be used to match an authorization message of a transaction to a clearing message of a same transaction.

As a non-limiting example, the transaction identifiers may include an account number or a card number (sometimes referred to as a primary account number or "PAN"), a time and date of the transaction, a location, a merchant identification, a merchant category code, and the like. In order to generate gratuity information about tips left by consumers based on location, a payment processor (e.g., a computing device thereof) may query a database such as an authorization database of a data warehousing system of the payment processor in order to retrieve authorization data relating to transactions carried out at one or more merchants in a given time period, for example during the past year. Respective authorizations included in the authorization data may include a first set of transaction identifiers and an authorized transaction amount, as well as other data. Similarly, the payment processor may query a clearing database of a data warehousing system in order to retrieve clearing data for the same time period as the retrieved authorization data. Here, respective clearings included in the clearing data may include a second set of transaction identifiers, a clearing transaction amount, as well as other data.

For example, the payment processor may match the first set of transaction identifiers of an authorization to the second set of transaction identifiers of a clearing, for a plurality of transactions, to generate a table of matched identifiers. Based on the table of matched identifiers, the payment processor may determine differences between a clearing transaction amount and a corresponding authorization transaction amount for each of a plurality of transactions. The difference in payment amount between a clearing and an authorization is the gratuity paid by a cardholder for a respective transaction. Accordingly, a plurality of gratuities may be stored together with the matched identifiers as well as other relevant transaction details such as merchant identifier, payment card identifier, location, time and date, in a gratuity database of the payment processor. For example, the clearing transaction may be represented by a clearing message, and the authorization transaction may be represented by an authorization message.

The stored gratuities may be used by the payment processor to determine various aggregate quantities which may depend on one or more of the merchant identifier, location, payment card identifier, time of day, day of week, and month of year, for example. An "aggregate quantity", as used herein, may refer to one or more summary statistics, including (without limitation) measures of location, dispersion, or statistical dependence. For example, an aggregate may be a mean of a set of values (e.g. a mean gratuity amount), or a more robust measure of location such as a median, trimmed mean, or Winsorized mean. An aggregate may also be a measure of dispersion such as a standard deviation, median absolute deviation, or interquartile range.

According to various examples, the payment processor may compute an average or median gratuity amount (e.g., average gratuity per transaction or average percentage of transaction authorization amount) for respective merchants, using the merchant identifier field of the authorization data. The average or median gratuity amount for each merchant may be stored in the gratuity database and may be updated at regular intervals as further transactions are received. Similar computations may be made by the payment processor for other variables such as merchant type (e.g., restaurant, bar or pub, taxi, hotel, etc.), location (e.g., city, suburb or state), time of day (e.g., 12 pm-3 pm and 6 pm-9 pm), or combinations of these. In each case the results may be stored in the gratuity database. Additional examples of calculating a gratuity can be found in Singapore Patent Application No. 10201504093U, which is incorporated herein by reference in its entirety.

Because the clearing data and the authorization data contain two different price amounts, the payment processor is able to determine the amount of tip that was added. For example, the initial authorization data may contain the base price for food at a restaurant which may be twenty dollars. Accordingly, the initial authorization data will include a charge of twenty dollars. If a customer subsequently adds a five dollar tip, the clearing data will indicate a final settlement amount including an additional five dollars that has been added, for a total amount of twenty-five dollars. Accordingly, the payment processor may determine that a five dollar tip has been added to a twenty dollar base price by comparing the clearing data and the authorization data. With this information, the payment processor may determine not only the tip amount, but also a percentage of the tip with respect to the base price, which in this example is twenty five percent ($5/$20). In addition, the authorization data and/or the clearing data may include a merchant identification as well as a geographic location of the merchant. The location information may also be stored by the payment processor. Accordingly, the payment processor may group together tipping data of a group of similar types of businesses (i.e., an aggregate) based on location, for example, barber shops, Chinese restaurants, taxi cab companies, golf courses, and the like.

Tipping data may provide a predictive indicator of merchant service volatility, community financial volatility, and a local economy, among other measures. For example, tipping data about a particular merchant may provide a person interested in applying for employment with the merchant, a predictive indicator of an amount of gratuity the potential employee is likely to receive. Furthermore, an aggregate of tipping data for a particular type of business in a particular area may provide a potential business owner with a predictive indicator of how a new business of the same type will fare in the particular area. Accordingly, a person such as a potential employee or a potential business owner may receive real-world gratuity information not previously available to the person, which the person may use when making a decision about employment or business ownership.

Example of a Gratuity Analyzing Process

FIG. 1 is a data flow block diagram illustrating an example of a process of calculating and analyzing gratuity data in accordance with an example embodiment of the present disclosure.

Referring to FIG. 1, process 100 may analyze transaction data over a period of time, and determine gratuity information based on the transaction data over the period of time. For example, the transaction may be a purchase made using a payment card, for example, a credit card, a debit card, a prepaid card, a charge card, a membership card, a promotional card, a frequent flyer card, an identification card, a gift card, and/or any other device that may hold payment account information, such as a mobile phone, a fob, and the like. Also, the period of time may be any desired amount of time, for example, a week, a month, a year, two years, and the like. In addition, the period of time is not necessarily the most recent period of time but may be, for example, a period of time from a previous month, a previous year, a previous two years, and the like.

In this example, authorization data is generated at block 110. Authorization is the process of approving or declining a transaction before a purchase is finalized or cash is disbursed. For example, the authorization data may be based on a purchase of items such as goods and/or services from a merchant. As a non-limiting example, the items may include a round of golf, a meal at a restaurant, a cab ride, a service provided by a moving company, a barber shop, a hair salon, a cleaning service, and the like. In this example, the authorization data includes one or more transaction identifiers about the transaction which may include an account number or a card number, a time and date of the transaction, a location, a merchant identification, a merchant category code, and the like. The authorization data may be generated in response to an employee of the merchant entering payment information such as the payment card or payment account information of a purchaser. The authorization data may be stored in a database, for example, a data warehousing system of a payment processor.

At block 120, clearing data is generated. Clearing includes the process of exchanging transaction data between a payment processor and an issuing bank (i.e., issuer). From the information provided in clearing, a payment processor may calculate the amounts for settlement. Clearing includes sending transactions from the processor to the issuer for posting to the cardholder's account (also known as "presentment"). The payment processor gathers the information, edits it, assesses the appropriate fees, and sends it on to the appropriate receiver. The clearing messages contain data but do not actually exchange or transfer funds. Like the authorization data, the clearing data also includes one or more transaction identifiers. Also, the clearing data may be stored in a database such as the data warehousing system of the payment processor.

Based on the authorization data and the clearing data, gratuity information may be calculated at block 130. For example, a payment processor may query a database such as an authorization storage and a clearing storage of the data warehousing system to retrieve authorization data and clearing data relating to transactions carried out at one or more merchants at one or more locations in a given time period, for example during the past month, during a past year, during a previous month, during a previous year, and the like. The payment processor may match the transaction identifiers of the authorization data to the transaction identifiers of the clearing data to generate a table of matched identifiers. Based on the table of matched authorizations and clearings, the payment processor may determine gratuities paid by cardholders for the respective transactions, for example, based on a difference in payment amount between the clearing data and the authorization data of a corresponding transaction. The payment processor may determine gratuities for a number of transactions based on purchases by a number of different users. The gratuity information may be stored by the payment processor.

In block 140, the payment processor may determine average gratuity information for a specific merchant or for a group of merchants of the same type within a similar location. For example, the payment processor may calculate the gratuities left by cardholders at a particular merchant over a particular amount of time, for example, a burger restaurant over the past month. In this example, the payment processor may determine an average gratuity left by cardholders at the burger restaurant over the last month and generate tip data. For example, the tip data may include a tip percentage, a tip amount, a current tipping trend for the business, and the like. The current tipping trend may be calculated by comparing historical tipping data with current tipping data and determining a trend based on the comparison.

As another example, the payment processor may group together similar types of merchants located in the same area, and determine average gratuity information for the group of merchants of the same type within the similar location. For example, the payment processor may group together a plurality of burger restaurants included in a particular zip code, and calculate average gratuity data of the plurality of burger restaurants based on calculated gratuities at the burger restaurants in the particular zip code instead of calculated gratuities at an individual burger restaurant. In this example, the gratuity information from a plurality of merchants is aggregated together and may provide an average gratuity of that type of merchant in a particular location.

In block 150, merchants or groups of merchants are compared with each other and a ranking is provided at block 170. In this example, the ranking determined at block 150 and provided at block 170 may be based on and/or in response to an input of a user at block 160. Here, at block 160 the user may determine whether to be provided with tip data of individual merchants or groups of merchants. For example, the user may input one or more locations, a merchant type, and or other information.

For example, at block 150, individual merchants located in a similar location may be compared with each other and a ranking of the merchants based on tip data may be provided (FIG. 4) at block 170. This information may be helpful to someone looking for employment in a particular area. As another example, tip data of similar merchant types at the same location may be grouped together, and tip data of groups of similar types of merchants from different locations may be compared with each other at block 150 and provided to the user (FIG. 6) at block 170. This information may be helpful to someone interested in opening a business of a same or similar type of business provided by the grouped merchants.

As described above and herein, in some embodiments, the system and/or components thereof (e.g., a payment process or gratuity analyzing computing device, FIG. 2) may store merchant identifiers and/or associated payment amounts, gratuity amounts, base price amounts, and total amounts, and/or cardholder/account identifiers, without including sensitive personal information, also known as personally identifiable information or PII, in order to ensure the privacy of individuals and/or merchants associated with the stored data. Personally identifiable information may include any information capable of identifying an individual. For privacy and security reasons, personally identifiable information may be withheld and only secondary identifiers may be used. For example, data received by the system and/or components thereof may identify user "John Smith" as user "ZYX123" without any method of determining the actual name of user "ZYX123". In some examples where privacy and security can otherwise be ensured (e.g., via encryption and storage security), or where individuals consent, personally identifiable information may be received and used by the system. In situations in which the systems discussed herein collect personal information about individuals and/or merchants, or may make use of such personal information, the individuals and/or merchants may be provided with an opportunity to control whether such information is collected or to control whether and/or how such information is used. In addition, certain data may be processed in one or more ways before it is stored or used, so that personally identifiable information is removed. For example, an individual's identity may be processed so that no personally identifiable information can be determined for the individual, or an individual's geographic location may be generalized where location data is obtained (such as to a city, ZIP code, or state level), so that a particular location of an individual cannot be determined. Moreover, certain information about a particular merchant may be generalized or aggregated to information about an associated merchant type, to obscure merchant-level data.

Example of Gratuity Analyzing Computing Device

FIG. 2 is a diagram illustrating an example of a gratuity analyzing computing device in accordance with an example embodiment of the present disclosure.

Referring to FIG. 2, gratuity analyzing computing device 200 includes a receiver 210, a calculator 220, an analyzer 230, a transmitter 240, and a processor 250. Although not illustrated, the gratuity analyzing computing device 200 may include other components, for example, a memory, a display, an input unit, and the like. Gratuity analyzing computing device 200 may correspond to or be controlled by a payment processor.

Receiver 210 may receive transaction data for use in calculating and analyzing gratuity information of a plurality of cardholders who made purchases at a plurality of merchants in a plurality of locations. For example, receiver 210 may receive authorization data and clearing data of a plurality of transactions. The authorization data and the clearing data may be stored locally or may be stored remotely, for example, in a data warehouse of a payment processor. In some examples, receiver 210 may receive the transaction data in response to a query transmitted by transmitter 240 to a remote device such as the data warehouse. The transaction data received by receiver 210 may include transactions that occur during a predetermined period of time, for example, over a week of time, a month of time, a year of time, and the like.

The receiver 210 may also receive input from various users. For example, the receiver may receive an input from a user via a user computing device such as a desktop computer, a mobile device, a personal digital assistant (PDA), a tablet, an MP3 player, a laptop computer, and the like. The input from the user may be received via a wired connection, a wireless connection, or a combination thereof. In response to receiving a user input, the receiver 210 may store the user input in a memory (not shown) of the gratuity analyzing computing device. Furthermore, the user input may be used to control the analyzer 230 as is further explained herein.

Based on the received transaction data, the calculator 220 may match authorization transactions to clearing transactions, for example, based on one or more transaction identifiers included within both the authorization transactions and the clearing transactions. Calculator 220 may determine a gratuity amount for a matched transaction based on a difference in a payment amount between a clearing transaction and an authorization transaction. For example, the calculator 220 may determine a gratuity amount for all matched transactions, and store the gratuity data locally or remotely along with the transaction data.

Gratuity information may be provided to a user, for example, based on an input of the user received by the receiver 210. For example, the receiver 210 may receive a request from the user for merchants within a specific location. In response, analyzer 230 may analyze the gratuity amounts generated by calculator 220 and generate tip data about merchants corresponding to the transactions who are within the specific location requested by the user. For example, analyzer 230 may determine an average tip amount for a particular merchant, a group of merchants, a location, and the like. Analyzer 230 may also determine whether a tip amount, tip percentage, and the like are currently trending upward or downward by comparing current tip data with previous tip data. As a non-limiting example, tip data of a merchant during a current month may be compared with tip data of the merchant during the same month, in a previous year, to determine whether the tip data is currently trending upward or downward.

Transmitter 240 may transmit the analyzed tip data results to the user, for example, through a wired and/or wireless connection. For example, a user may logon to a web browser controlled by a payment processor, an issuing bank, and the like, and receive tip data by requesting tip data through the web browser. As another example, the user may have a mobile application stored on a mobile device of the user. The payment processor, issuing bank, and the like, may have an application stored on a computing device thereof that supports the mobile application stored on the mobile device of the user. Accordingly, the user may request tip data through the mobile application stored on the user's mobile device.

Processor 250 may control the overall operation of gratuity analyzing computing device 200. Also, in some examples, one or more of receiver 210, calculator 220, analyzer 230, and transmitter 240 may be performed or controlled by processor 250.

Example of Gratuity Analyzing Method

FIG. 3 is a diagram illustrating an example of a gratuity analyzing method in accordance with an example embodiment of the present disclosure.

Referring to FIG. 3, method for analyzing gratuity 300 may be performed by a computing device associated with or corresponding to a payment processor. In this example, authorization data and clearing data of a plurality of transactions may be received, in 310. For example, the authorization data and the clearing data may be received automatically based on a predetermined timer, at various intervals. As another example, the authorization data and the clearing data may be received in response to a request or a query for the authorization data and the clearing data that is received from the computing device. For example, the authorization data and the clearing data may be transaction data generated during a time period that may be identified by the query transmitted by the computing device. As a non-limiting example, the time period may be the previous week, the previous month, the previous year, and the like. Also, to determine trending information, the period of time information may include a period of time that is in the past, for example, a period of time from a year ago, and the like.

Based on the authorization data and the clearing data, in 320 authorization data from a respective transaction may be matched to transaction data from the same transaction. For example, a table may be generated in which transaction identifiers included in authorization data from a plurality of transactions is respectively matched with transaction identifiers included in clearing data from the plurality of transactions. In this example, the computing device may determine that an authorization message matches a clearing message based on one or more transaction identifiers common to both an authorization message and a clearing message.

According to various examples, in 330, the method 330 may further include calculating tip data for the plurality of transactions. Based on the matched transaction data, the payment processor may determine gratuities paid by cardholders for the respective transactions, for example, based on a difference in payment amount between a total payment amount of the clearing data and a total payment amount of the authorization data of a corresponding transaction. The payment processor may determine gratuities for a plurality of transactions based on purchases by a plurality of different users. Also, the gratuity information may be stored by the payment processor.

In 340 the calculated tip data may be analyzed and a plurality of merchants may be ranked against each other based on the calculated tip data thereof. For example, in response to a user input for a particular location, tip data of a plurality of different merchants may be compared with each other, and a ranking from best to worst tip data may be generated and provided to the user. In this example, the tip data may include an average amount of tip, an average tip percentage, and/or an indication as to whether the tip percentage is trending up or down. As another example, tip data of a plurality of similar types of business in a particular location may be grouped together. For example, a type of merchant such as barbershops in the same neighborhood, zip code, city, county, and the like, may be analyzed and tip data from the barbershops may be aggregated to generate tip data for a type of business in a particular location.

The aggregation may be performed for similar types of businesses. Accordingly, tip data of a group of merchants of a first type of business may be compared with tip data of a different group of merchants of a second type of business located in the same location. As another example, different locations may be compared with each other. For example, tip data from a group of merchants of a first type of business in a first location may be aggregated. Also, tip data of a group of merchants of the first type of business but located in a second location may be aggregated. Accordingly, tip data of groups of businesses in different locations may be compared with each other. For example, tip data of a group of hair salons located in Kansas City, Mo. may be compared with tip data of a group of hair salons located in St. Louis, Mo.

The compared and ranked tip data of the merchants from one or more locations may be output to a user, in 350. For example, the ranked tip data may be displayed through a web browser on a screen of a user computer. As another example, the ranked tip data may be transmitted to a mobile device of the user through a mobile application, and the ranked tip data may be displayed on a screen of the mobile device.

Ranking Algorithm

One or more example embodiments herein provide a device and method for comparing and relating merchants to each other based on tip data. For example, the gratuity analyzing computing device may generate a score for a merchant based on the processed gratuities. Once scored, a merchant or a group of merchants may be compared with other merchants, or other groups of merchants, and be ranked from highest score to lowest score. For example, tip data may include categories of tipping information such as average tip amounts, average tip percentages, and the like, and also merchant ID's associated with the tipping information.

The tip data may be gathered and calculated over any desired amount of time, for example, a day, a week, a month, and the like. The payment processor may also keep a record of a geographic location of the merchants. Accordingly, tip data for a plurality of merchants near the same location may be recorded and grouped together based on geographic location.

According to various examples, in addition to average gratuity data, trending gratuity data may be calculated for merchants. For example, the gratuity analyzing computing device may receive current gratuity information and historical gratuity information about a merchant from a database such as a payment processor warehousing system in order to generate tip trending data. In this example, analyzer 230 (shown in FIG. 2) may calculate a score for a merchant or a group of merchants based on the received current gratuity information and the received historical gratuity information. Accordingly, the gratuity analyzing computing device may analyze gratuity information from a plurality of merchants or group of merchants and relate or otherwise compare the merchants based on the analyzed gratuity information.

The historical tip data used for trending calculations may include the same or similar tip data as the current tip data. For example, the current tip data and the historical tip data, for a respective merchant, may each include an average tip amount, an average tip percentage, a tip combination (tip combo), and the like. Tip combo, as further described herein, is an average tip percentage multiplied by an average tip amount. Also, as further explained herein, variables of the tip data may be given different weights in determining a score for a merchant. For example, average tip amount, average tip percentage, and tip combo may receive separate weights used in determining an overall score of a merchant. By comparing the current tip data with the historical tip data for a particular merchant it is possible to determine if tips at that particular merchant are presently trending upwards or downwards based on the comparison of the current tip data to the historical tip data.

As a non-limiting example, the historical tip data may include tipping information from a previous time period that corresponds to the time period of the current tip data. For example, the historical tip data may be calculated based on the same time of year from a previous year, and the like. That is, historical may be defined as a similar period of time in a previous year. To determine the tipping trend of a business or group of businesses, a current tip combo and a historical tip combo may be generated. According to various examples, the current tip combo is the current average tip percentage multiplied by the current average tip amount. For example, if the current average tip amount is $1.48 and the current average tip percentage is 15%, the current tip combo would have a value of 1.48*0.15=0.222. Likewise, the historical tip combo may be determined by multiplying the historical average tip percentage by the historical average tip amount.

An example of a ranking score for three merchants is illustrated in Table 1, below. In this example, the tip amount, the tip percentage with respect to the original purchase, and a trending value for each merchant are input to a ranking algorithm which generates a score for each merchant, enabling the merchants to be compared against each other based on the ranking scores.

TABLE 1

| Tip Left | Tip % | Hist. Tip Combo | Curr. Tip Combo | Trending | Ranking |
|---|---|---|---|---|---|
| $1.48 | 15.00% | 0.212 | 0.222 | 0.01 | 0.654 |
| $1.26 | 11.00% | 0.140 | 0.1386 | −0.0014 | 0.5478 |
| $1.01 | 6.00% | 0.0703 | 0.0606 | −0.0097 | 0.42606 |

The tip left category is the average tip amount left by customers over a given period of time, the tip percentage is the average tip % left by customers over a given period of time, the historical tip combo is the historical average tip % multiplied by the historical average tip, the current tip combo is the current average tip percentage multiplied by the current average tip, and the trending is the difference between the current tip combo and the historical tip combo. Each row represents a different merchant within a similar geographic region. For the gratuity analyzing computing device to determine a geographic region, a user may input a geographic location through an input unit of the geographic analyzing computing device to receive a comparison of merchants or merchant types in that geographic area. For example, a user may enter the name of a city, a zip code, an address, and the like, through the input unit.

In this example, the Trending value included in the fifth column is determined by subtracting a value of the historical tip combo from a value of the current tip combo. The total ranking is represented as the sixth and last column and is determined based on a weighted algorithm. An example of the weight given to each variable of the weighted algorithm is provided in Table 2, below.

TABLE 2

| | |
|---|---|
| % importance of tip amount ($) | 40.00% |
| % of importance of tip percentage (%) | 40.00% |
| % importance of tip combo value | 20.00% |

In this example, the analyzer generates the final score for each merchant using the following equation: ((Tip Left*Importance of Tip Left)+(Tip % *Importance of Tip %)+(Trending*Importance of Trending)). The resulting total scores are shown on the far right column of Table 1. In this example, the term "importance" corresponds to the weighted value. Here, the highest ranking business has a total score of 0.654 while the lowest ranking business has a score of 0.42606. Also, although not used in this example, additional variables may be used to calculate a score for each merchant. For example, the score may be calculated based on the importance of a distance between merchant and a current location of the user, and the like. As another example, merchants may be sorted or ranked based on closest location with respect to a current location of a user of a mobile device.

Here, the current tip dollar amount is given a 40% weighted value, the current tip percentage is also given a 40% weighted value, and the tip combo trending value is given a 20% weighted value. It should also be appreciated that the weighting values may be dynamically adjusted, for example, automatically or by a user and are not limited to the weighted values shown. For example, weighted values may be automatically provided by a payment processor (i.e., default weights). As another option, a user may edit the weights based on their preference.

As a non-limiting example, in states, cities, areas, and/or the like, where the average tip and tip % is lower or higher than the country average (for example, 5%, 10%, 20%, and the like) then the importance of the trending may be weighted higher or lower. For example, in Montana the average tip % may be 8% lower than the national average. In this example, an importance of the trending over time may be more important. That is, in states where the tip % is greatly different from the national average, the user may desire to rely more on whether the tip combo is trending upwards or downwards. Also, in some examples, the importance of tip amount and tip percentage by default may be prevented from dropping below a threshold percentage, for example, 30%. In these examples, the national and state averages may also be determined based on other transaction data.

Examples of Ranking Merchants and Merchant Types Based on Gratuity

FIG. 4 is a diagram illustrating an example of a ranking of tip data of different businesses in the same location being compared with each other, in accordance with an example embodiment of the present disclosure.

Referring to FIG. 4, in this example a ranking of merchants located in the same geographical location are compared with each other. For example, the ranking may be performed by a gratuity analyzing computing device such as described in the example of FIG. 2. Furthermore, the ranking may be displayed on a user's device, for example, a computer screen, a mobile device, a tablet, and the like. In this case, the geographic location is set to a zip code (i.e., 62294) which corresponds to the city of Troy, Ill. The merchants in this example include two restaurants (i.e., Troy Restaurant and China Garden), a barbershop (i.e., Dave's Barber), and a shoe shine shop (i.e., Troy Shoe Shine). Even though some of the merchants are of a different business type, the computing device ranks each merchant based on gratuity information.

In this example, a user may input the zip code 62294. For example, in response to the zip code being input, the computing device may send a request to a database such as a payment processor warehousing database system requesting transaction data over a predetermined time period for merchants that have a geographic location having a zip code of 62294. In response, the computing device may receive the transaction data from the warehouse database system, and match authorization data to clearing data to generate a plurality of matched transactions. Here, the authorization data and the clearing data may also include location information such as a merchant identification, a merchant location, a date, a time, a location, and the like, of the transaction. Accordingly, in addition to matching authorization data to clearing data, the computing device also determine a geographic location, a merchant, and the like, corresponding to the matched transaction.

Based on the merchants that correspond to the matched transactions and a location input by the user, the computing device may select one or more of the merchants within that location and generate tip data for the one or more merchants. For example, the computing device may select four merchants as shown in FIG. 4. As another example, the computing device may select at least two merchants in order to generate a comparison of gratuity ranking.

The tip data generated by the computing device in FIG. 4 includes a tip percentage, a tip amount, and a tip trending indicator. As an example, Troy Restaurant has the greatest average tip amount. Accordingly, if a sort feature based on greatest average tip amount is selected by a user, the merchants may be listed from greatest average tip amount to least average tip amount. In this case, the merchants are listed from the greatest average tip amount for Troy Restaurant ($4.33) to the least average tip amount for Troy Shoe Shine ($1.01). A user who is interested in applying for a job in the geographic location of zip code 62294 may use the results to identify a potential job that provides the greatest average tip amount.

Moreover, merchants listed may be interested in viewing the generated tip data about themselves to assess how they compare to other merchants in the geographic location, as tip data may be a useful proxy measure for quality of service. For example, a merchant may by interested in viewing comparative tip data for themselves and a plurality of other merchants to gauge a quality of service offered at their location, compared to the quality of service offered at the plurality of other merchants. The merchant may also be interested in the tip trend for their merchant location, as a decrease may indicate a worsening quality of service or customer experience.

FIG. 5 is a diagram illustrating an example of a ranking of tip data of different groups of businesses in the same location being compared with each other, in accordance with an example embodiment of the present disclosure.

Referring to FIG. 5, instead of individual merchants being ranked against each other, gratuity information of groups of similar types of merchants are aggregated together, and a single value for each tip data variable is generated to represent the entire group of merchants. In this example, the user inputs the geographic location of zip code 62294. In this example, the computing device returns a ranking of different groups of merchants with different types of businesses. Here, Mexican restaurants are grouped together, and tip data therefrom is aggregated to generate one average tip percentage and one average tip amount for all of the Mexican restaurants, combined. Similarly, bars, barber shops, and cleaning services are grouped together, and aggregate tip data is generated for each group.

FIG. 6 is a diagram illustrating an example of a ranking of tip data of groups of merchants of a same type of business, in different locations, being compared with each other, in accordance with an example embodiment of the present disclosure.

Referring to FIG. 6, merchants are grouped together based on location, and aggregate tip data is generated and compared for each group of merchants. For example, a user may input multiple locations (in this case zip codes 63368, 63301, and 62294), and also input a business type (i.e., barber shops). In this case, a first group of merchants includes a group of barber shops located in Troy, Ill. Here, the computing device generates tip data for the barber shops in the first group and aggregates the tip data such that the entire group is represented by one aggregate value for each tip data variable (i.e., average tip percentage, average tip amount, and tip trending). In addition, tip data for barbershops in St. Charles, Mo. and O'Fallon, Mo. are aggregated and a single value for each tip data variable is generated for each group. Accordingly, a person interested in opening a barber shop may use this information to determine what city offers the best tips to barbers.

According to various example embodiments, an employee whose income includes tips, for example, servers, bartenders, beauticians, taxi drivers, and the like, may utilize tip data to determine an optimal community or a beneficial community and/or merchant to work at. Also, a potential business purchaser may utilize tip data to determine an optimal place to open a particular type of business.

In one or more examples provided herein, the gratuity computing device utilizes a combination of authorization data, clearing data, merchant identification, and location data to calculate tip information by location. This information may be stored in a database accessible by the gratuity analyzing computing device and be broken out by merchants, locations, time intervals, and the like. After this information is derived, it may be utilized to rank locations and merchants based on tipping information and trending patterns.

In some examples, the gratuity analyzing computing device may be capable of controlling another device or an output of another device based on analyzed gratuity information of a merchant. For example, a server or computing device may host a website or mobile application. The website or mobile application may display a map of a requested area on a user device, for example, a map of a city, a map of a zip code, a map of a county, a map of a state, and the like. Based on tip data of a plurality of merchants at a plurality of geographic locations analyzed by the gratuity analyzing computing device, the gratuity analyzing computing device may transmit a signal to the server or other computing device to control the hosted website or mobile application to display gratuity information and tip data based on the map and/or based on a geographic location of the user on the map.

For example, the gratuity analyzing computing device may transmit a signal that may include generated tip data about one or more merchants. That is, the gratuity analyzing computing device may transmit a data signal identifying merchants closest to a user location, and also gratuity information about the merchants. Here, the tip data may compare merchants near the user location and rank tip data of the merchants with respect to each other. As another example, the gratuity analyzing computing device may be used to combine merchant data at areas and transmit a signal to the server indicating a tip data ranking of areas near or around the user. As an example, the areas may be defined by zip codes, cities, counties, and the like.

Based on the information received from the gratuity analyzing computing device, a server may be controlled to control a website or mobile application to display tip data and related information about merchants and/or areas near the user. Accordingly, the tip data generated by the gratuity analyzing device described herein may be used to control other devices, such as servers hosting a website or mobile application.

Additional Considerations

The computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

For example, one or more computer-readable storage media may include computer-executable instructions embodied thereon for analyzing gratuity. In this example, the computing device may include a memory device and a processor in communication with the memory device, and when executed by said processor the computer-executable instructions may cause the processor to perform a method such as the method described and illustrated in the example of FIG. 3.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example, the system is executed on a single computer system, without a connection to a server computer. In a further example, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gratuity analyzing computing device comprising a processor in communication with a memory, said gratuity analyzing computing device communicatively coupled to a payment processor, said processor configured to:
   receive, from an authorization database and a clearing database of the payment processor, transaction data of a plurality of merchants, the transaction data comprising authorization transaction messages and clearing transaction messages, wherein each authorization transaction message includes a base amount and each clearing transaction message includes a sum of a gratuity amount and a base amount;
   match each authorization transaction message with a clearing transaction message that corresponds to the same payment transaction based on one or more transaction identifiers included in both the authorization and clearance transaction messages;
   generate, and store in the memory, a table of matched transaction identifiers, wherein the table includes one or more transaction identifiers of each authorization transaction message matched to one or more transaction identifiers of a corresponding clearance transaction message;
   calculate, based on the table of matched transaction identifiers, gratuity amounts for each matched authorization transaction message and clearing transaction message by calculating a difference in payment amount between the clearing transaction message and the authorization transaction message;
   store, in the memory, the calculated gratuity amounts in association with the matched transaction identifiers;
   receive a user input from a user computing device, the user input including a geographic location;
   select, based on the received user input, at least two merchants from among the plurality of merchants, the at least two merchants having geographic locations within a threshold distance from the geographic location included in the received user input;
   generate tip data for each merchant of the at least two merchants, the tip data for a respective merchant being generated based on calculated gratuity amounts stored in the memory for matched authorization and clearance transaction messages that correspond to the respective merchant, the tip data including at least an average tip amount, an average tip percentage of a base price, and a tip trend that indicates whether the gratuity amounts for the respective merchant are trending upwards or downwards over time;
   rank the at least two merchants based on a comparison of the generated tip data of the at least two merchants with respect to each other by applying, for each merchant, weighted values to each of the average tip amount, the average tip percentage, and the tip trend; and
   output the rank and the tip data of the at least two merchants to a user by displaying the rank and the tip data of the at least two merchants on the user computing device, wherein the rank is an improved quantifiable indicator of services provided by the at least two merchants.

2. The gratuity analyzing computing device of claim 1, wherein the at least two merchants comprise a first merchant of a first type of business and a second merchant of a second type of business, the first type of business being different from the second type of business.

3. The gratuity analyzing computing device of claim 1, wherein the geographic location includes a first geographic location and a second geographic location,
   wherein the at least two merchants comprise at least two groups of merchants, the at least two groups of merchants comprising a first group of merchants of a first type of business being located in the first geographic location, and a second group of merchants of a second type of business being located in the second geographic location, and wherein the processor is configured to generate tip data for each group of merchants by aggregating tip data of the merchants included in a respective group.

4. The gratuity analyzing computing device of claim 3, wherein the first type of business of the first group of merchants is different than the second type of business of the second group of merchants.

5. The gratuity analyzing computing device of claim 3, wherein the first type of business of the first group of merchants is the same as the second type of business of the second group of merchants, and wherein the first geographic location is different than the second geographic location.

6. A computer-implemented method for analyzing gratuity data of merchants and ranking merchants based on the analyzed gratuity data, the method being performed using a computing device including a processor in communication with a memory, and coupled to a payment processing device, the method comprising:

receiving, by the processor, from an authorization database and a clearing database of the payment processing device, transaction data of a plurality of merchants, the transaction data comprising authorization transaction messages and clearing transaction messages, wherein each authorization transaction includes a base amount and each clearing transaction includes a sum of a gratuity amount and a base amount;

matching, by the processor, each authorization transaction message with a clearing transaction message that corresponds to the same payment transaction based on one or more transaction identifiers included in both the authorization and clearance transaction messages;

generating, and storing in the memory, by the processor, a table of matched transaction identifiers, wherein the table includes one or more transaction identifiers of an authorization transaction message matched to one or more transaction identifiers of a corresponding clearance transaction message;

calculating, based on the table of matched transaction identifiers, gratuity amounts for each matched authorization transaction message and clearing transaction message by calculating a difference in payment amount between the clearing transaction message and the authorization transaction message;

storing, in the memory, the calculated gratuity amounts in association with the matched transaction identifiers;

receiving, by the processor, a user input from a user computing device, the user input including a geographic location;

selecting, by the processor, based on the received user input, at least two merchants from among the plurality of merchants, the at least two merchants having geographic locations within a threshold distance from the geographic location included in the received user input;

generating, by the processor, tip data for each merchant of the at least two merchants, the tip data for a respective merchant being generated based on calculated gratuity amounts stored in the memory for matched authorization and clearance transaction messages that correspond to the respective merchant, the tip data including at least an average tip amount, an average tip percentage of a base price, and a tip trend that indicates whether the gratuity amounts for the respective merchant are trending upwards or downwards over time;

ranking, by the processor, the at least two merchants based on a comparison of the generated tip data of the at least two merchants with respect to each other by applying, for each merchant, weighted values to each of the average tip amount, the average tip percentage, and the tip trend; and outputting, by the processor, the rank and the tip data of the at least two merchants to a user by displaying the rank and the tip data of the at least two merchants on the user computing device, wherein the rank is an improved quantifiable indicator of services provided by the at least two merchants.

7. The method for analyzing gratuity data of claim 6, wherein the at least two merchants comprise a first merchant of a first type of business and a second merchant of a second type of business, the first type of business being different from the second type of business.

8. The method for analyzing gratuity data of claim 6, wherein the geographic location includes a first geographic location and a second geographic location, wherein the at least two merchants comprise at least two groups of merchants, the at least two groups of merchants comprising a first group of merchants of a first type of business being located in the first geographic location, and a second group of merchants of a second type of business being located in the second geographic location, and wherein the generating comprises generating tip data for each group of merchants by aggregating tip data of the merchants included in a respective group.

9. The method for analyzing gratuity data of claim 8, wherein the first type of business of the first group of merchants is different than the second type of business of the second group of merchants.

10. The method for analyzing gratuity data of claim 8, wherein the first type of business of the first group of merchants is the same as the second type of business of the second group of merchants, and wherein the first geographic location is different than the second geographic location.

11. One or more computer-readable storage media having computer-executable instructions embodied thereon for analyzing gratuity data of merchants and ranking merchants based on the analyzed gratuity data, wherein a computing device includes a memory device and a processor in communication with the memory device, the computing device being communicatively coupled to a payment processor, and when executed by said processor, the computer-executable instructions cause said processor to:

receive, from an authorization database and a clearing database of the payment processor, transaction data of a plurality of merchants, the transaction data comprising authorization transaction messages and clearing transaction messages, wherein each authorization transaction includes a base amount and each clearing transaction includes a sum of a gratuity amount and a base amount;

match each authorization transaction with a clearing transaction that corresponds to the same payment transaction based on one or more transaction identifiers included in both the authorization and clearance transaction messages;

generate, and store in the memory device, a table of matched transaction identifiers, wherein the table includes one or more transaction identifiers of an authorization transaction message matched to one or more transaction identifiers of a corresponding clearance transaction message;

calculate, based on the table of matched transaction identifiers, gratuity amounts for each matched authorization transaction message and clearing transaction message by calculating a difference in payment amount between the clearing transaction message and the authorization transaction message;

store, in the memory device, the calculated gratuity amounts in association with the matched transaction identifiers;

receive a user input from a user computing device, the user input including a geographic location;

select, based on the received user input, at least two merchants from among the plurality of merchants, the at least two merchants having geographic locations within a threshold distance from the geographic location included in the received user input;

generate tip data for each merchant of the at least two merchants, the tip data for a respective merchant being generated based on calculated gratuity amounts stored in the memory device for matched authorization and clearance transaction messages that correspond to the respective merchant, the tip data including at least an average tip amount, an average tip percentage of a base price, and a tip trend that indicates whether the gratuity amounts for the respective merchant are trending upwards or downwards over time;

rank the at least two merchants based on a comparison of the generated tip data of the at least two merchants with respect to each other by applying, for each merchant, weighted values to each of the average tip amount, the average tip percentage, and the tip trend; and output the rank and the tip data of the at least two merchants to a user by displaying the rank and the tip data of the at least two merchants on the user computing device, wherein the rank is an improved quantifiable indicator of services provided by the at least two merchants.

* * * * *